United States Patent Office 2,729,639
Patented Jan. 3, 1956

2,729,639
AMINO-ISO-MELAMINE

John J. Roemer, Tamaqua, Pa., and Donald W. Kaiser, Hamden, Conn., assignors to American Cyanamid Company, New York, N. Y., a corporation of Maine No Drawing. Application May 9, 1955,
Serial No. 507,136

6 Claims. (Cl. 260—249.6)

The present invention relates to a new composition of matter, amino-iso-melamine, and to a method for its preparation.

The new compound of the present invention can be represented by the structural formula

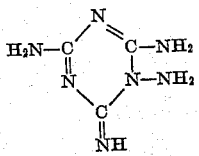

or tautomer thereof.

An acid salt of the new compound can be prepared by treating dicyanoguanidine with hydrazine, preferably in an inert solvent, and preferably using the reactants in the form of their salts, e. g., an alkali metal dicyanoguanidine and a hydrazine salt such as the monohydrochloride, sulfate, nitrate, phosphate, acetate, or the like. The hydrazine salt should be the neutral salt. The proportion of reactants is not particularly critical, but preferably the hydrazine salt is used in excess.

The reaction of the present invention occurs simply on reacting dicyanoguanidine and hydrazine at 50°–100° C. A convenient reaction temperature is from about 90° C. to about 100° C. Any of several inert solvents can be used. Water is the preferred solvent, but other menstrua such as glycol or the glycol mono alkyl ethers have been found satisfactory.

In the following example an illustrative preparation of a salt of the new compound is shown. This procedure, however, is merely intended as illustrative and not by way of limitation.

Example 1

Potassium dicyanoguanidine (29.4 g.—0.2 mole) is placed in a 1 liter round bottom flask and an aqueous solution of hydrazine monohydrochloride (41.1 g.—0.6 mole in 150 ml. H₂O) is added. This mixture is then heated on a steam bath for 3 hours. Filtering the reaction product off at 1 hr. intervals yields 17.33 grams of amino-iso-melamine monohydrochloride. This white crystalline product did not melt at a temperature up to 360° C. It was soluble to the extent of about 2–3% in water giving a neutral solution from which a picrate of M. P. 233° C. was obtained.

Where the amino-iso-melamine free base is desired, it is easily prepared by treating a salt thereof with a suitable acid-neutralizing agent in a conventional manner. This is shown in the following illustrative example.

Example 2

Amino-iso-melamine hydrochloride, prepared as in Example 1 is placed in a flask and treated with 10% aqueous sodium hydroxide. Free base is precipitated as an amorphous solid which is collected and washed with cold water. Washed solids are taken up in hot water and recrystallized. So purified product is the free base.

It is slightly soluble in water, forming a strongly basic solution. The solid decomposes at 242° C.

One observation with respect to the discussion of the use of dicyanoguanidine herein should be noted. Dicyanoguanidine, per U. S. Patent 2,371,100, was considered to have the symmetrical formula

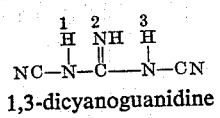

1,3-dicyanoguanidine which suggests that the free acid dicyanoguanidine should be dibasic. Up to the present time, however, no dibasic salts of dicyanoguanidine have been prepared, but instead only the monobasic salts, e. g., potassium dicyanoguanidine, which might be named 1-potassium,1,3-dicyanoguanidine by the original nomenclature. For this and other reasons, it is now believed that the formula of dicyanoguanidine as prepared in the above Patent 2,371,100 is best represented as that of an unsymmetric monobasic acid, which may be considered a structural tautomer of the symmetrical form, thus:

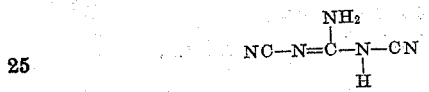

The potassium salt would thus be best represented by the formula

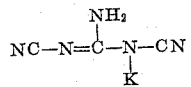

or (identically) as

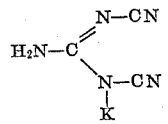

the latter being named preferably 1-potassium,1,2-dicyanoguanidine.

Accordingly, when dicyanoguanidine is mentioned in this specification, the compound referred to is that prepared by the procedure of U. S. Patent 2,371,100, there named 1,3-dicyanoguanidine, but which is probably preferably named as the tautomer 1,2-dicyanoguanidine. So far as is now known, the 1,1-dicyanoguanidine isomer does not exist.

The new compound of the present invention can be used similarly to melamine in resin and plastic formulation, and the like. It is also useful as an intermediate in the preparation of dyes, pharmaceuticals, ion exchange resins, and as a nitrogen additive to ferrous metals. It has also proved effective in inhibiting the usual tarnishing effect on metallic articles such as silver and silver alloys in treating them with modern chemical detergent preparations. This highly useful property which is possessed both by the free base and its salts is illustrated in the following example, which again is intended only as illustrative.

Example III

From a commercially obtained detergent mixture comprising about 50% sodium tripolyphosphate, 28% organic sulfonates, 15% sodium sulfate, 3.5% sodium silicate, 3.5% moisture and a small amount of sodium chloride, is prepared a solution containing about 1.65 g./l. of detergent. Three portions are taken. To one portion is added 0.5% amino-iso-melamine, free base to another 0.5% of the amino-iso-melamine hydrochloride. Test strips of nickel-silver are immersed in each of the three solutions for seven minutes at about 42° C. On removal and water-washing the metal strips, it is found that samples immersed in the untreated solution are badly tarnished, those immersed in both solutions containing amino-iso-melamine are not.

The present application is a continuation-in-part of our copending application, Serial No. 356,591, filed May 21, 1953, now abandoned, which in turn, was copending with and a continuation-in-part of our application, Serial No. 304,451, filed August 14, 1952, now abandoned.

What we claim is:

1. Amino-iso-melamine, having the formula

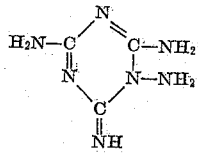

2. The method of preparing amino-iso-melamine that comprises subjecting a dicyanoguanidine tautomer of the group consisting of

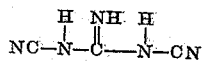

and

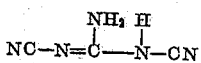

to the action of hydrazine in an inert solvent.

3. The method of preparing amino-iso-melamine that comprises subjecting an alkali metal dicyanoguanidine tautomer of the group consisting of

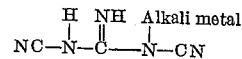

and

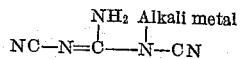

to the action of an excess of a hydrazine salt in an inert solvent.

4. The method according to claim 2 in which the solvent is water.

5. The method according to claim 3 in which the reaction is conducted at about 90 to 100° C.

6. The method according to claim 4 in which the potassium dicyanoguanidine is reacted with hydrazine monohydrochloride.

No references cited.